United States Patent [19]
Schneider

[11] Patent Number: 5,735,312
[45] Date of Patent: Apr. 7, 1998

[54] SANITARY WATER VALVE

[75] Inventor: Hermann-Josef Schneider, Schweich, Germany

[73] Assignee: American Standard Inc., Piscataway, N.J.

[21] Appl. No.: 655,530

[22] Filed: May 30, 1996

[30] Foreign Application Priority Data

Jun. 16, 1995 [DE] Germany ............... 195 22 098. 6

[51] Int. Cl.$^6$ ..................... F16K 11/074; F16K 27/04
[52] U.S. Cl. ........................... 137/625.4; 251/282
[58] Field of Search ............ 137/625.4, 625.17; 251/282

[56] References Cited

U.S. PATENT DOCUMENTS 5,494,076  2/1996  Knapp ........................ 137/625.17
5,609,188  3/1997  Oberdorfer ................. 137/625.17
5,655,566  8/1997  Casas ......................... 137/625.17

*Primary Examiner*—Marguerite McMahon
*Attorney, Agent, or Firm*—Elaine Brenner Robinson

[57] ABSTRACT

A sanitary water valve having control elements consisting of at least two discs. The first disc is arranged immovably and constitutes the valve seat disc and the second disc, which constitutes the control disc, is arranged movably on the first disc and has a surface conduit for deflection functions which can simultaneously be made to overlap the inflow apertures and outflow aperture on the first disc. The second disc includes one or more depressions which substantially reduce the actuation forces required to open the water valve and as a result, operating efficiency is considerably enhanced.

5 Claims, 5 Drawing Sheets

SANITARY WATER VALVE

BACKGROUND OF THE INVENTION

The present invention is directed to a sanitary water valve and more particularly to a mixing valve assembly having control elements of specific construction to reduce the force required for opening and closing the valve control elements.

Sanitary water valves with disc-shaped control elements have been in use for many years. To diminish the pressure of the discs against one another and thereby reduce actuation forces, hydraulic counterforces are produced to act over specific surface area relationships, as a result of which the pressure on the fixed disc is partly compensated for. Until now, this manner of reducing actuation forces has been effective particularly with the water valve in the open state. It has been found, however, that in current constructions, the actuation forces required to open the water valve are still relatively high, and are much greater than the actuation forces required to move the water valve when in the open state.

Thus, it is desirable to reduce actuation forces necessary to open the water valve in a sanitary mixing valve assembly.

SUMMARY OF THE INVENTION

It is therefore an object of the invention to provide a sanitary water valve which requires very little actuation forces to open the valve.

It is a further object to produce and utilize hydraulic counterforces advantageously to improve the operation of the sanitary valve.

These and other objects are achieved by the present invention which provides a sanitary water valve having control elements consisting of at least two discs, the first disc of which is arranged immovably, constituting the valve seat disc. The first disc includes a pair of inflow apertures for the entry of cold and hot water which are further connected to the water inlets and an outflow aperture coupled to a water outlet pipe. On top of the first disc is the second disc, constituting the control disc, which is arranged movably on the first disc and has a surface conduit for deflection functions which can simultaneously be made to overlap the inflow apertures and outflow aperture on the first disc, such that connection of the outflow aperture and the inflow apertures to the water outlet and the water inlets occurs by means of static annular seals. The seals have diameters which are greater than the free cross section of the respective apertures. When the water valve is in the closed state, the first disc is pressed, by way of the force of all annular seals and the hydraulic forces acting in the surrounding region of the inflow apertures delimited by the annular seals, against the second disc. The disc pressure is reduced by the magnitude of the hydraulic counterforces to which the regions of the sealing surface of the second disc, which close off the free cross section of the inflow apertures, are exposed. When the water valve is in the open state, additional hydraulic counterforces are effective which are directed toward the bottom of the surface conduit of the second disc and the region of the sealing surface of the first disc. Thus, a reduction in force occurs as a result of the magnitude of the hydraulic forces to which the surrounding region of the outlet opening, delimited by the annular seal, is exposed.

BRIEF DESCRIPTION OF THE DRAWINGS

The invention will be more fully appreciated from the following detailed description when the same is considered in connection with the accompanying drawings in which.

DETAILED DESCRIPTION OF THE DRAWINGS

Figure 1:
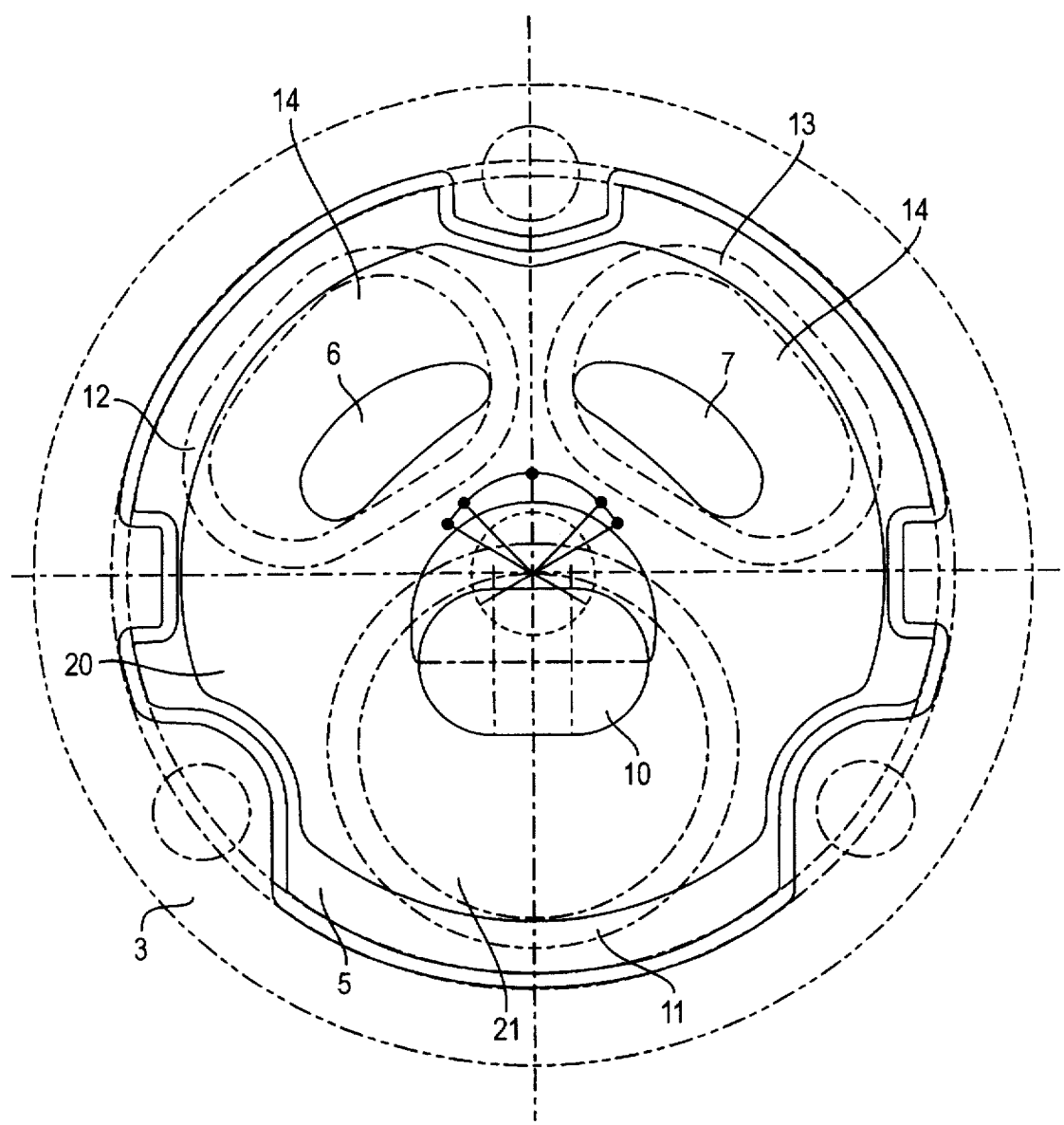
FIG. 1 is a top plan view of a first disc in accordance with the claimed invention.
Figure 2:
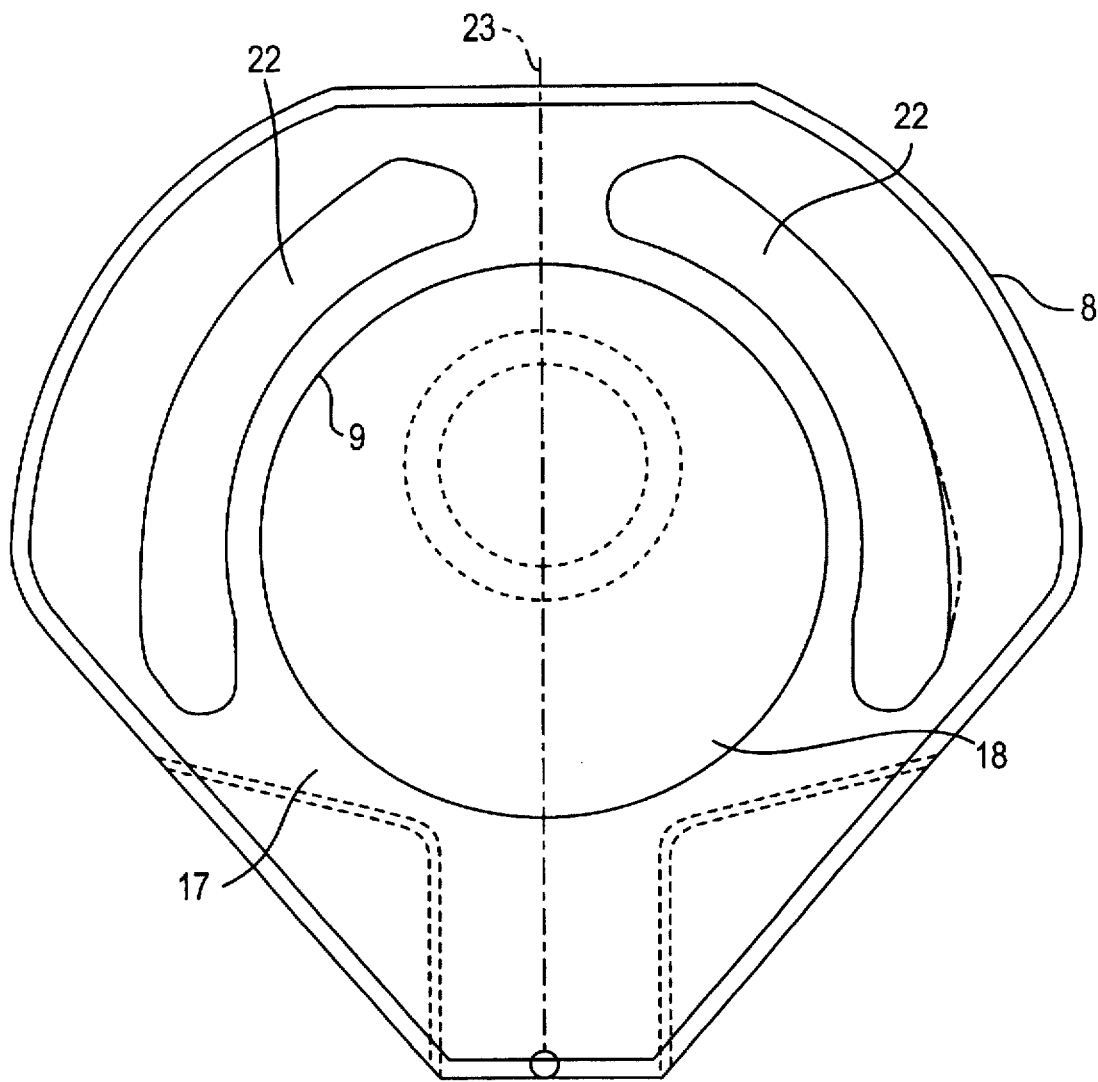
FIG. 2 is a top plan view of a second disc.

Reference is now made to FIG. 1 which depicts a valve housing 3 containing first sealing disc 5. Disc 5 is of conventional design, arranged immovably, and has two inflow apertures 6 and 7 for the entry of hot and cold water. Inflow apertures 6 and 7 are connected at one end to water inlets (not shown), and at the other end are directed toward a second disc 8, shown in FIG. 2, constituting the control disc. Second disc 8 is movable on first disc 5, and possesses a surface conduit 9 for deflection functions, that can simultaneously be made to overlap inflow apertures 6 and 7 and an outflow aperture 10 that is also located in first disc 5. Connection of outflow aperture 10 and inflow apertures 6 and 7 to the water outlet and water inlets, respectively, of the sanitary valve occurs by means of static annular seals 11, 12, and 13, the diameters of which are greater than the cross sections of the respective apertures 10, 6, and 7.

Figure 3:
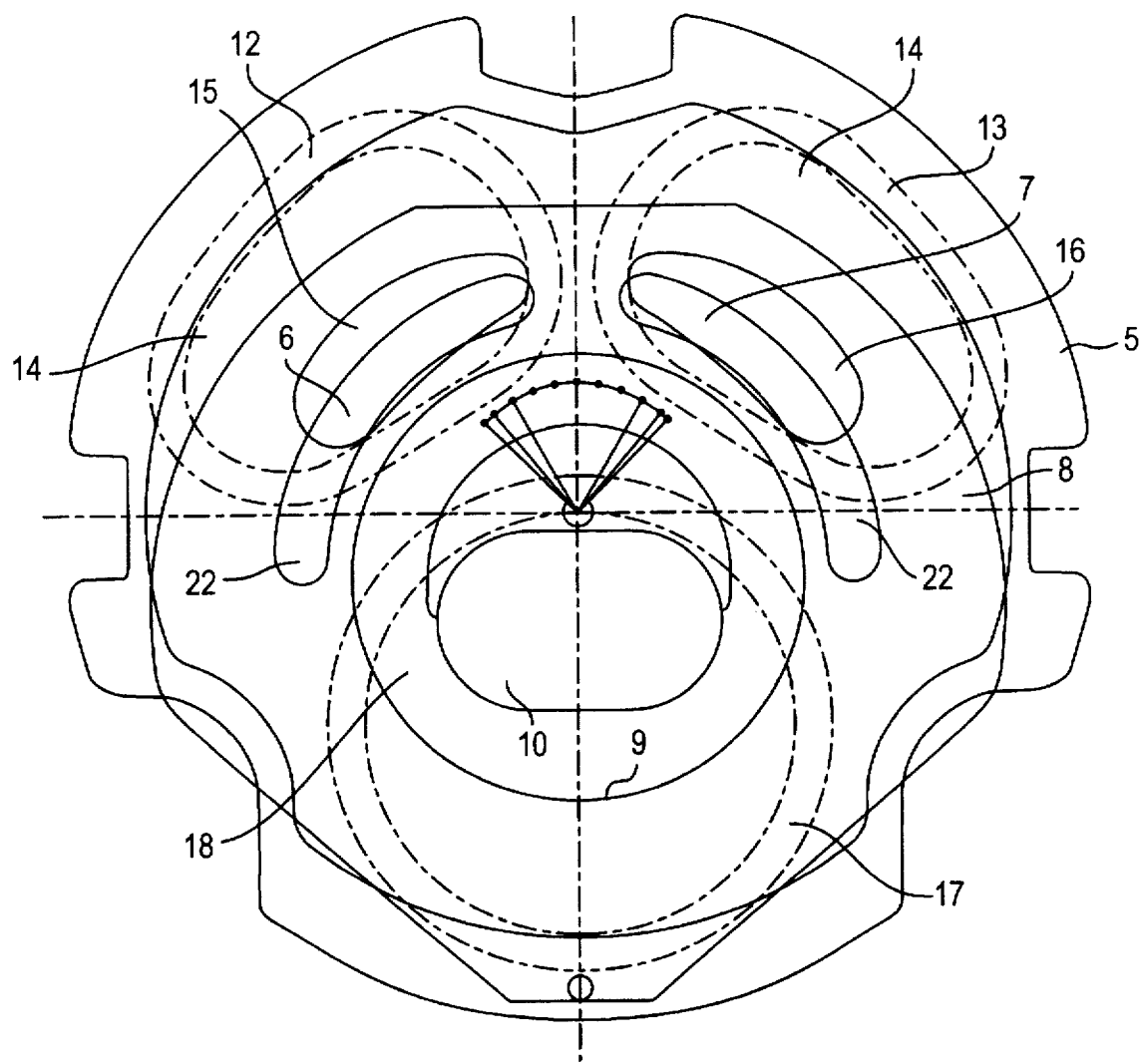
FIG. 3 is a top plan view of the discs according to FIGS. 1 and 2 in mutual contact as a disc pair and in closed center position.
Figure 4:
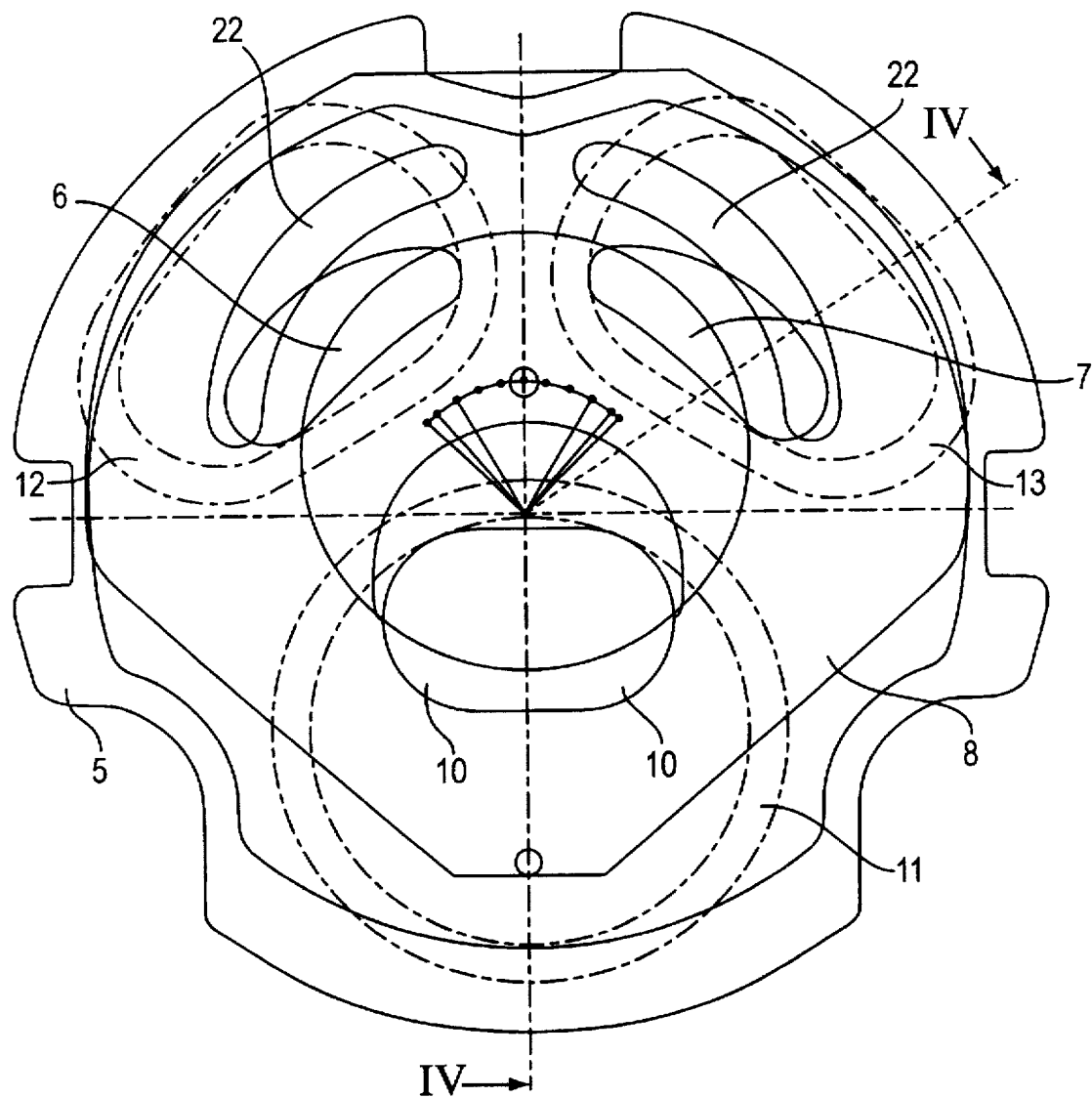
FIG. 4 is a top plan view of the disc pair in FIG. 3 in open center position.
Figure 5:
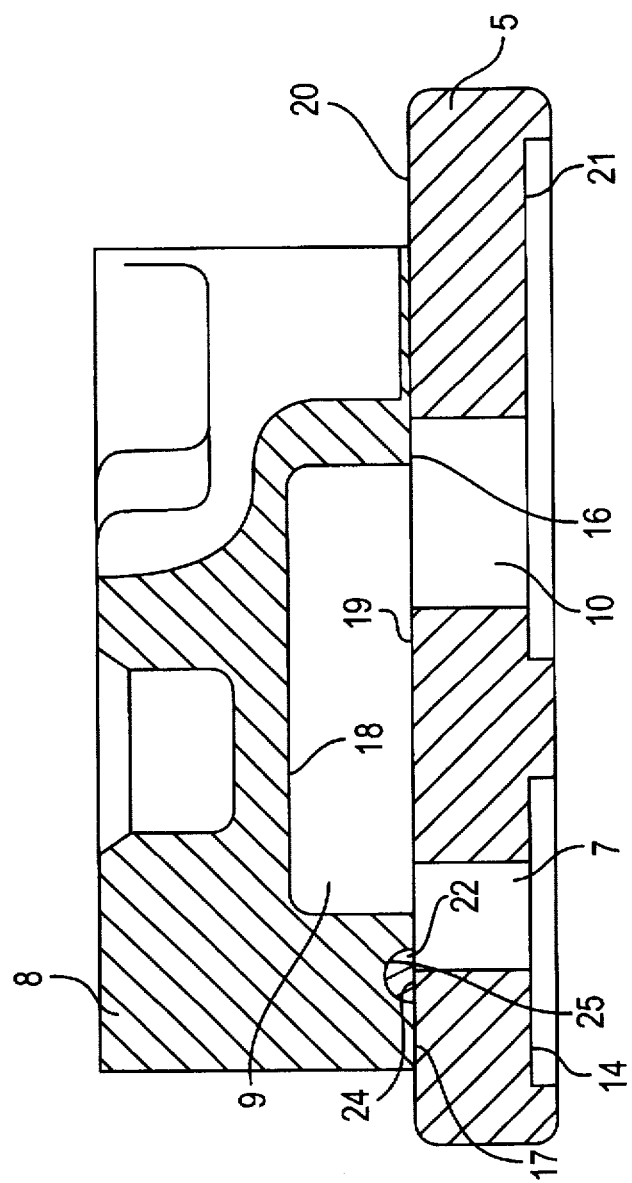
FIG. 5 is a sectional view of FIG. 4 along line IV—IV.

Reference is now made to FIG. 3 which shows disc 5 in direct contact with disc 8 when the valve is in closed center position. In closed position, disc 5 is pressed, by way of the force of annular seals 11, 12, and 13, against second disc 8. The pressure of the discs on one another is increased by the magnitude of the hydraulic forces effective in the surrounding region 14, delimited by annular seals 12 and 13, of inflow apertures 6 and 7. The disc pressure is reduced by the magnitude of the hydraulic counterforces to which regions 15 and 16 of the sealing surface 17 of second disc 8, which close off the free cross section of inflow apertures 6 and 7, are exposed. Additional hydraulic counterforces, which are directed toward bottom 18 of surface conduit 9 and region 19, delimited by surface conduit 9, of sealing surface 20 of first disc 5, are effective with the water valve in the open state. A reduction thus occurs by the magnitude of the hydraulic forces to which surrounding region 21 of outflow opening 10, delimited by annular seal 11, is exposed.

In the exemplary embodiment of the invention that is depicted, sealing surface 17 of second disc 8 has two depressions 22 of elongated shape that are provided in a symmetrical arrangement with respect to centerline 23 of second disc 8. Depressions 22 extend into the respective active region of sealing surface 20 of first disc 5, and with sealing surface 20 form pocket-shaped chambers which initially, with the water valve in the closed state, are exposed to supply pressures. In this manner, the entire pressure acting on first disc 5, which in the closed state is composed of the preload forces of annular seals 12 and 13 and the inlet-side hydraulic forces, is reduced by the magnitude of the hydraulic counterforces to which region 24 of sealing surface 20, overlapping depressions 22 of first disc 5, and the corresponding region of bottom 25 of depressions 22, are exposed. With the water valve in the closed state, depressions 22 are intended to be at least one-third overlapped by sealing surface 20 of first disc 5.

The incorporation of depressions 22 in disc 8 substantially reduce the actuation forces required to open the water valve and, as a result, the operating efficiency is considerably enhanced. In the exemplary embodiment shown, the additional hydraulic counterforces which reduce disc pressure are effective even with the water valve in the closed state, thus guaranteeing a further improvement in operating ability.

It is possible for pocket-shaped chambers, in accordance with the invention, to be utilized in double-handle fitting assemblies with disc-shaped control elements. Moreover, the depressions can also be provided in equivalent fashion in the immovable valve seat disc. Additionally, pocket-shaped chambers, according to the invention, consisting of depressions which are overlapped by sealing surface regions, can also be used in single-lever mixing assemblies in which the valve seat disc has only inflow apertures, while the outflow aperture is arranged laterally, behind the inflow apertures in the flow direction, in a cartridge-like housing receiving the disc-shaped control elements. With this kind of embodiment, which is also known as an "open system" because the water does not flow back via the first valve disc constituting the valve seat disc, the incoming water flows from the inflow apertures directly to the lateral outflow aperture of the cartridge-like housing, as is similarly the case with the aforesaid two-handle fixtures.

Although illustrative embodiments of the present invention have been described herein with reference to the accompanying drawings, it is to be understood that the invention is not limited to those precise embodiments, and that various other changes and modifications may be effected herein by one skilled in the art without departing from the scope or spirit of the invention.

What is claimed is:

1. A sanitary water valve including a housing containing control elements formed from at least two discs, the first of said discs fixedly disposed and provided with inlet apertures and an outlet aperture, a first side of said first disc adapted to be coupled to water supply pipes at said inlet apertures and adapted to be coupled to a water outlet pipe at said outlet aperture, a second side of said first disc contiguous with the second of said discs, said second disc movably arranged on said first disc and having a surface duct for deflecting functions, said surface duct is able to overlap simultaneously said inlet apertures and said outlet aperture, a plurality of static seals in said housing contiguous with said inlet and outlet apertures, the improvement wherein:

said second disc has one or more depressions therein, said depressions form chambers with a surface of said second side of said first disc, whereby said chambers relieve any pressure which may be acting on said first disc.

2. The sanitary water valve of claim 1 wherein said depressions are of elongated shape and whereby said depressions are overlapped by said surface of said first disc by at least one-third and no greater than two-thirds of said inlet apertures.

3. The sanitary valve of claim 2 wherein said second disc includes two depressions in a symmetrical arrangement with respect to a centerline of said second disc.

4. The sanitary valve of claim 1 wherein said valve is a single lever mixing assembly.

5. The sanitary valve of claim 1 wherein said valve is a double handle mixing assembly.

* * * * *